US011573777B2

(12) United States Patent
Azimi et al.

(10) Patent No.: US 11,573,777 B2
(45) Date of Patent: *Feb. 7, 2023

(54) METHOD AND APPARATUS FOR ENABLING AUTONOMOUS ACCELERATION OF DATAFLOW AI APPLICATIONS

(71) Applicant: HUAWEI TECHNOLOGIES CO., LTD., Shenzhen (CN)

(72) Inventors: Reza Azimi, Aurora (CA); Cheng Xiang Feng, Markham (CA); Kai-Ting Amy Wang, Toronto (CA); Yaoqing Gao, Toronto (CA); Ye Tian, Markham (CA); Xiang Wang, North York (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/186,352

(22) Filed: Feb. 26, 2021

(65) Prior Publication Data

US 2021/0182041 A1 Jun. 17, 2021

Related U.S. Application Data

(63) Continuation of application No. 16/570,822, filed on Sep. 13, 2019, now Pat. No. 11,144,290.

(51) Int. Cl.
*G06F 8/41* (2018.01)
(52) U.S. Cl.
CPC .................. *G06F 8/4441* (2013.01)
(58) Field of Classification Search
CPC .................................................. G06F 8/4441
See application file for complete search history.

(56) References Cited

U.S. PATENT DOCUMENTS 7,627,671 B1 * 12/2009 Palma ................ G06F 11/3616
709/223
7,685,404 B2 * 3/2010 Biles .................... G06F 8/4441
712/34

(Continued)

FOREIGN PATENT DOCUMENTS

KR 20160143548 A 12/2016

OTHER PUBLICATIONS

Xue Jilong, "Core Fusion: The "Acceleration Artifact" of GPU Deep Learning", Microsoft Research Asia, Retrieved from the internet: https://www.msra.cn/zh-cn/news/features/kernel-fusion-20170925, Sep. 25, 2017. total 5 pages.

(Continued)

*Primary Examiner* — Douglas M Slachta

(57) ABSTRACT

A method includes analyzing a dataflow graph representing data dependencies between operators of a dataflow application to identify a plurality of candidate groups of the operators. Based on characteristics of a given hardware accelerator and the operators of a given candidate group of the plurality of candidate groups, determining whether the operators of the given candidate group are to be combined. In response to determining that the operators of the given candidate group are to be combined, retrieving executable binary code segments corresponding to the operators of the given candidate group, generating a unit of binary code including the executable binary code segments and metadata representing an execution control flow among the executable binary code segments, and dispatching the unit of code to the given hardware accelerator for execution of the unit of code.

17 Claims, 6 Drawing Sheets

(56) References Cited

U.S. PATENT DOCUMENTS

| | | | |
|---|---|---|---|
| 8,108,871 B2 * | 1/2012 | Rhine | G06F 9/5061 |
| | | | 718/104 |
| 8,490,072 B2 | 7/2013 | Andrade et al. | |
| 8,510,744 B2 | 8/2013 | Dallman et al. | |
| 8,997,071 B2 * | 3/2015 | Chen | G06F 8/451 |
| | | | 717/149 |
| 10,268,454 B2 | 4/2019 | Schuchman et al. | |
| 10,318,261 B2 * | 6/2019 | Rajnak | G06F 8/51 |
| 10,372,497 B1 * | 8/2019 | Zelenov | G06F 9/5044 |
| 10,656,964 B2 * | 5/2020 | Kolachala | G06Q 10/10 |
| 10,733,016 B1 | 8/2020 | Xu et al. | |
| 2006/0095722 A1 | 5/2006 | Biles et al. | |
| 2006/0123401 A1 * | 6/2006 | O'Brien | G06F 8/45 |
| | | | 717/131 |
| 2007/0150855 A1 * | 6/2007 | Jeong | G06F 8/36 |
| | | | 717/106 |
| 2014/0068578 A1 | 3/2014 | Gedik et al. | |
| 2014/0344817 A1 * | 11/2014 | Jovanovic | G06F 9/5066 |
| | | | 718/102 |
| 2015/0199787 A1 * | 7/2015 | Pechanec | G06F 9/5044 |
| | | | 345/522 |
| 2015/0347105 A1 * | 12/2015 | Avkarogullari | G06F 8/4441 |
| | | | 717/154 |
| 2016/0358070 A1 | 12/2016 | Brothers et al. | |
| 2017/0061568 A1 * | 3/2017 | Metz | G06T 1/20 |
| 2017/0315815 A1 * | 11/2017 | Smith | G06F 9/30185 |
| 2018/0150298 A1 * | 5/2018 | Balle | G06F 9/505 |
| 2018/0173291 A1 * | 6/2018 | Levit-Gurevich | G06F 1/3206 |
| 2019/0095229 A1 * | 3/2019 | Guo | G06F 9/4552 |
| 2019/0188526 A1 | 6/2019 | Chen et al. | |
| 2019/0265985 A1 * | 8/2019 | Cao | G06F 9/445 |
| 2019/0317880 A1 * | 10/2019 | Herr | G06F 11/3447 |
| 2019/0347125 A1 * | 11/2019 | Sankaran | G06F 9/30014 |
| 2019/0377559 A1 * | 12/2019 | Strosaker | G06F 8/427 |

OTHER PUBLICATIONS

Martin Abadi, Ashish Agarwal, Paul Barham, Eugene Brevd, et. al. "TensorFlow: a System for Large-Scale Machine Learning"; 12th USENIX Symposium on Operating Systems Design and Implementation (OSDI '16). Nov. 2-4, 2016 • Savannah, GA, USA.

Paszke, Adam et. al. "Automatic differentiation in PyTorch", 31st Conference on Neural Information Processing Systems (NIPS 2017), Long Beach, CA, USA.

* cited by examiner

METHOD AND APPARATUS FOR ENABLING AUTONOMOUS ACCELERATION OF DATAFLOW AI APPLICATIONS

CROSS-REFERENCE TO RELATED APPLICATIONS

This application is a continuation of U.S. patent application Ser. No. 16/570,822 filed on Sep. 13, 2019 and entitled METHOD AND APPARATUS FOR ENABLING AUTONOMOUS ACCELERATION OF DATAFLOW AI APPLICATIONS the entire contents of which is incorporated by reference.

FIELD OF THE INVENTION

The present invention pertains to the field of dataflow applications and in particular to a method and apparatus for improving the performance of dataflow programming applications by reducing the offload overhead related to offloading operators to hardware accelerators for execution.

BACKGROUND

Dataflow applications are computer programs (e.g. software) that are written using dataflow programing methods. Modern dataflow applications use the operators system to maximize software compatibility and composability. Developers of modern dataflow application use operators to create new algorithms by assembling operators as building blocks for these algorithms. A dataflow graph (see FIG. 2) may be used to represent how data flows among different operators (ops) of an algorithm in a dataflow application. During runtime, an execution engine of a host processing unit offloads operators in the dataflow application to different execution units such as central processing units (CPUs), graphic processing units (GPUs) or other forms of special-purpose hardware accelerators. In this approach, the hardware accelerators operate passively, i.e., they stay idle until new operators are formed and offloaded to them by the execution engine which runs on a host processing unit. The overhead of offloading a single operator to a hardware accelerator can be quite significant especially when operators have relatively small computation times.

There is a need for a method and apparatus for reducing the offload overhead related to offloading operators in dataflow applications to a hardware accelerator for execution.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for improving the performance of dataflow applications by reducing the offload overhead related to offloading operators to hardware accelerators for execution.

In accordance with embodiments of the present invention, there is provided a method including analyzing a dataflow graph representing data dependencies between operators of a dataflow application to identify a plurality of candidate groups of the operators. Based on characteristics of a given hardware accelerator and the operators of a given candidate group of the plurality of candidate groups, determining whether the operators of the given candidate group are to be combined. In response to determining that the operators of the given candidate group are to be combined, retrieving executable binary code segments corresponding to the operators of the given candidate group, generating a unit of binary code including the executable binary code segments and metadata representing an execution control flow among the executable binary code segments, and dispatching the unit of code to the given hardware accelerator for execution of the unit of code.

In a further embodiment, determining whether the operators of the given candidate group are to be grouped together includes determining whether the operators should be combined based on whether operators of the given candidate group are constrained to be executed on different hardware accelerators of a plurality of hardware accelerators.

In a further embodiment, determining whether the operators of the given candidate group are to be grouped together includes determining whether the operators should be combined based on available resources of the given hardware accelerator.

In a further embodiment, determining whether the operators of the given candidate group are to be grouped together includes determining whether the operators should be combined based on a number of the operators of the given candidate group.

In a further embodiment, determining whether the operators of the given candidate group are to be grouped together includes determining whether the operators should be combined based on a computation runtime associated with executing all of the operators of the given candidate group.

In a further embodiment, generating the unit of binary code includes generating metadata representing input parameters and output parameters for each operator of the given candidate group.

In a further embodiment, generating the unit of binary code includes generating metadata representing a plurality of navigation table entries. A given entry of the plurality of navigation entries includes a field associated with a size of the given entry and a pointer to a given executable binary code segment of the plurality of executable binary code segments.

In accordance with embodiments of the present invention, there is provided a computer system including a processor, a hardware accelerator, and a non-transient memory for storing instructions. When executed by the processor, the instructions cause the processor to execute a unit of binary code including executable binary code segments and metadata representing an execution control flow among the executable binary code segments. The executable binary code segments correspond to operators of a given candidate group. The operators of the given candidate group are selected based on, analyzing a dataflow graph representing data dependencies between operators of a dataflow application to identify a plurality of candidate groups of the operators, based on characteristics of the hardware accelerator and the operators of the given candidate group of the plurality of candidate groups, and determining that the operators of the given candidate group are to be combined. The unit of code is dispatched to the hardware accelerator for execution of the unit of code.

In a further embodiment, determining that the operators of the given candidate group are to be grouped together includes determining that the operators are combined based on constraints of the hardware accelerator.

In a further embodiment, determining that the operators of the given candidate group are to be grouped together includes determining that the operators should be combined based on available resources of the hardware accelerator.

In a further embodiment, determining that the operators of the given candidate group are to be grouped together includes determining that the operators should be combined based on a number of the operators of the given candidate group.

In a further embodiment, determining that the operators of the given candidate group are to be grouped together includes determining that the operators should be combined based on a computation runtime associated with executing all of the operators of the given candidate group.

In a further embodiment, generating the unit of binary code includes generating metadata representing input parameters and output parameters for each operator of the given candidate group.

In a further embodiment, generating the unit of binary code includes generating metadata representing a plurality of navigation table entries. A given entry of the plurality of navigation entries includes a field associated with a size of the given entry and a pointer to a given executable binary code segment of the plurality of executable binary code segments.

In a further embodiment, the unit of binary code includes glue code.

In accordance with an embodiment there of the present invention, there is provided a non-transient memory having stored therein instructions. The instructions when executed by a processor causing the processor to execute a unit of binary code including executable binary code segments and metadata representing an execution control flow among the executable binary code segments. The executable binary code segments correspond to operators of a given candidate group. The operators of the given candidate group are selected based on analyzing a dataflow graph representing data dependencies between operators of a dataflow application to identify a plurality of candidate groups of the operators. Based on characteristics of a hardware accelerator and the operators of the given candidate group of the plurality of candidate groups, the operators of the given candidate group are to be combined are determined. Dispatching the unit of code to the hardware accelerator for execution of the unit of code.

In a further embodiment, determining that the operators of the given candidate group are to be grouped together comprises determining that the operators are combined based on constraints of the hardware accelerator.

In a further embodiment, determining that the operators of the given candidate group are to be grouped together comprises determining that the operators should be combined based on a computation runtime associated with executing all of the operators of the given candidate group.

In a further embodiment, determining that the operators of the given candidate group are to be grouped together comprises determining that the operators should be combined based on a computation runtime associated with executing all of the operators of the given candidate group.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the invention comprise methods and apparatus for improving the performance of dataflow applications based on operators that are dispatched to accelerator hardware for execution. Embodiments comprise systems that enable hardware accelerators to execute super-ops (multi-operator portions) of a dataflow graph autonomously with minimal intervention from a host processor. The execution of dataflow applications is performed on a computer system that comprises a host processing unit and one or more hardware accelerators. The host processing unit controls the overall execution of the program and may dispatch ops or super-ops to be executed on hardware accelerators. The dispatching of ops (or super-ops) by an execution engine of the host processor to a hardware accelerator is referred to as "offloading."

Embodiment comprise an architecture that includes a development environment and a runtime environment for dataflow programming applications. Users, such as application developers utilize the architecture of the proposed system to develop and run dataflow applications. Based on a dataflow graph representation 102 of an application, a user uses a super-op compiler 104 (described below) to produce an output executable binary. The executable output of the compiler 104 may then be utilized by a runtime system to execute the program, which includes the offloading of super-ops (groups of ops) to accelerator hardware 108.

Figure 1:
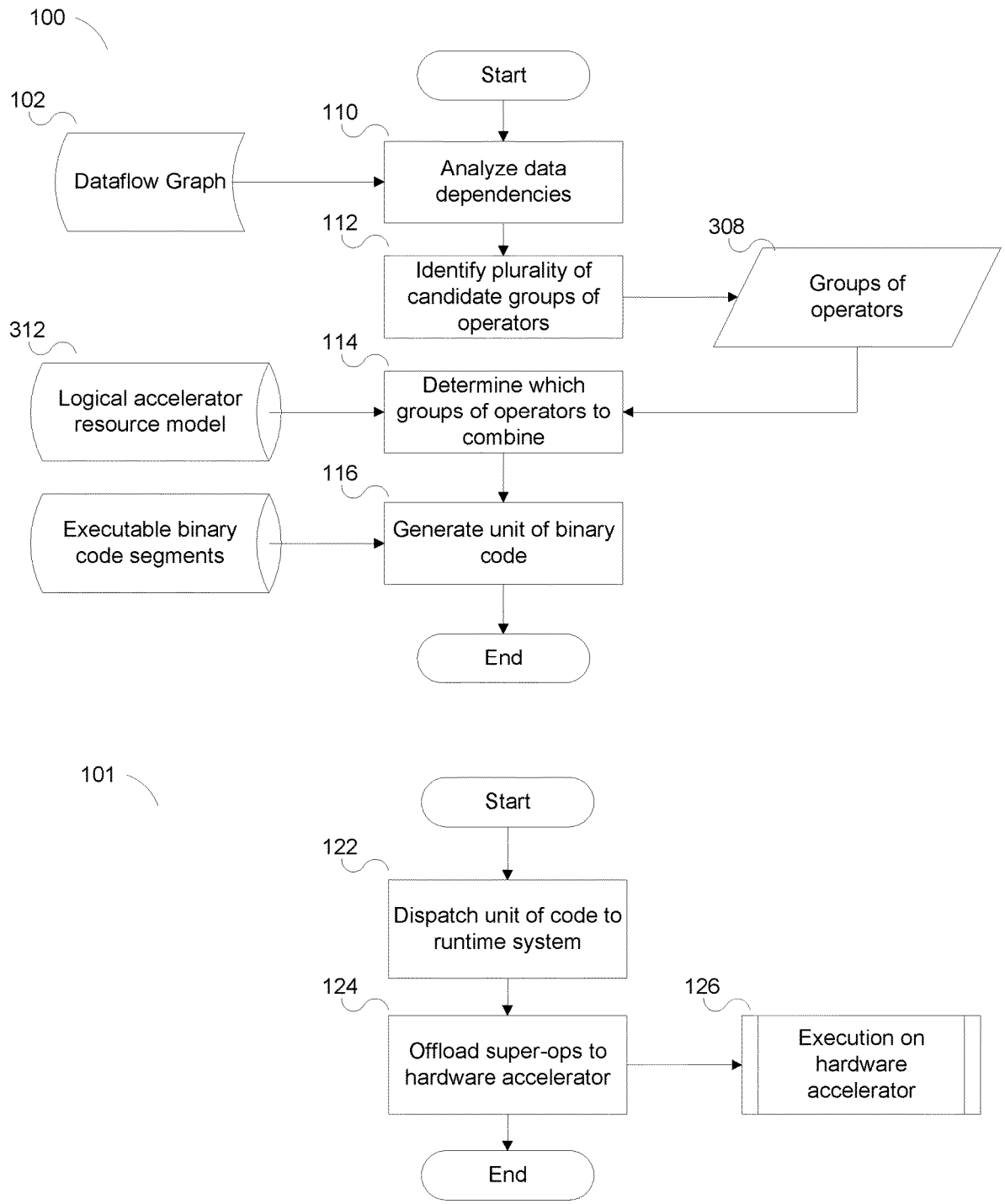
FIG. 1 illustrates a flowchart of a development workflow and an execution workflow using an embodiment.

FIG. 1 illustrates a flow chart of a development workflow 100 and a runtime workflow 101 according to an embodiment. The development workflow 100 and the runtime workflow 101 may be performed in sequence or independently. The development workflow 100 is performed by a super-op compiler 104 and starts with graph analyzer 304 analyzing 110 a dataflow graph representation 102 of the dataflow application to analyze data dependencies between the ops of the dataflow graph 102. The graph analyzer identifies 112 a plurality of candidate groups of operators 308 that may be stored in the super-op candidate repository (repo) 306. The determination 114 of which groups of operators to combine takes input from the logical accelerator resource model 312 which comprises parameters of capabilities or constraints of the hardware accelerator(s) 108 that are available to the system. Executable binary code segments are generated by the super-op code generator 312 and may be stored in the operators binary repository (ops bin repo) 316 for future use. If the super-op code generator 312 determines that an executable binary code segment 318 already exists, it can be obtained from the operators binary repository 316 without recompiling it. The super-op code generator 312 then generates 116 a unit of binary code. The unit of binary code contains all the necessary binaries, navigation tables 314, metadata, parameters, etc. that are required by the runtime system to execute the dataflow program, including offloading to a hardware accelerator 108.

The unit of binary code may be used by the runtime workflow 101 for immediate execution or for execution at a later time. The runtime workflow 101 comprises dispatching the unit of code to the runtime system of a host processor for execution. As part of the execution by the host processor, the runtime system may then offload ops and super-ops to the hardware accelerator 108 as instructed by the unit of binary code.

Figure 2:
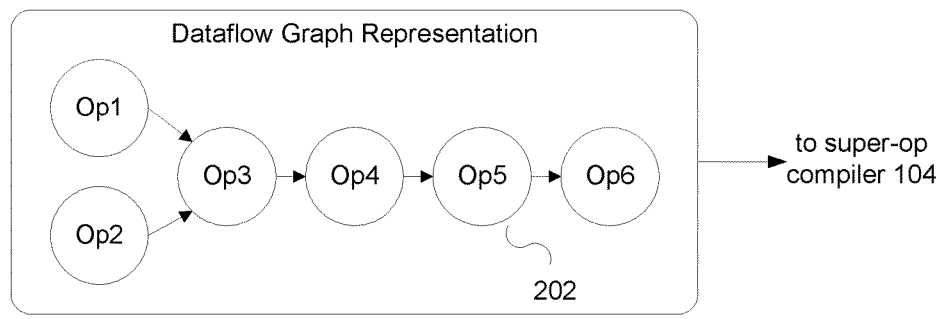
FIG. 2 illustrates an exemplary dataflow graph of a dataflow application.

FIG. 2 illustrates an exemplary dataflow graph 102 of a dataflow application for compiling by the super-op compiler of the present disclosure. The exemplary dataflow graph 102 includes six operators (hereinafter referred to as ops) Op1, Op2, Op3, Op4, Op5, and Op6. Ops, such as Op5 are linked by edges of the dataflow graph 102 that represent data paths. Given an op-based computation represented as a dataflow graph 102, a sub-graph that may be combined into a single op is identified. Then the parameters required as part of the computations of the sub-graph are analyzed. Parameters may include data types, tensor shapes, data formats, and any other hyper-parameters that are specific to the individual ops within the sub-graph. The values of the parameters of the sub-graph are used to generate code that represents the computation of the entire sub-graph as one large op, referred to herein as a super-op. The super-op may be offloaded to a hardware accelerator 108. The super-op is computationally equivalent to many elementary small ops offloaded to a hardware accelerator separately, however the super-op is offloaded with far less offload overhead. It will be appreciated that although the exemplary dataflow graph illustrated in FIG. 2 includes six ops, a dataflow graph may include any number of ops.

Figure 3:
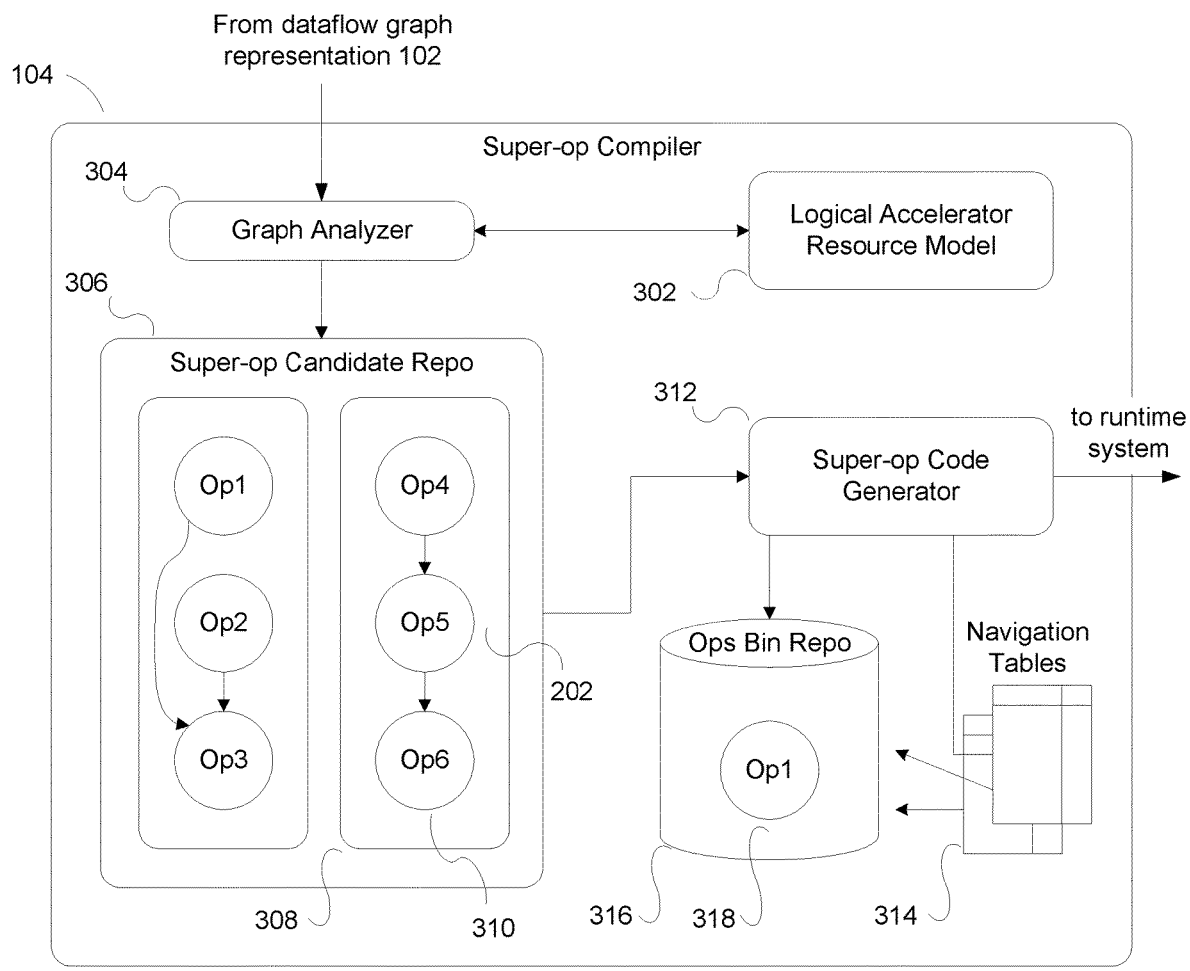
FIG. 3 illustrates the components of a super-op compiler according to an embodiment.

FIG. 3 illustrates a super-op compiler 104 according to an embodiment of the present disclosure. The super-op compiler 104 is software that includes instructions that are executable by a processor of a computing system, such as computing system 700 (see FIG. 7). The super-op compiler 104 includes a logical accelerator resource model 302, a graph analyzer 304, a super-op candidate repository 306, a super-op code generator 312, and an operators bin repository 316 (hereinafter referred to as ops bin repository 316). The graph analyzer 304 of the super-op compiler receives a dataflow graph 102 of a dataflow application, analyzes the dataflow graph 102, identifies which ops in the dataflow graph 102 can be combined into a super-op that can be passed to the super-ops code generator 312, and outputs super-op candidates that include the ops that can be combined. The graph analyzer 304 may utilize information and constraints from a logical accelerator resource model 302 and a variety of other sources when making this identification. The logical accelerator resource model 302 comprises information on available resources of the hardware accelerator 108, and constraints of the hardware accelerator 108. The dataflow graph 102 may include information that indicates which ops can be offloaded to a hardware accelerator, (including specifying which hardware accelerator if there is more than one hardware accelerator available) or if offloading is allowable at all. Decisions regarding the offloading of ops (referred to as offloading decisions) may be provided explicitly or implicitly by programmers. Offloading decisions may also be determined by an offload analyzer (not shown) that indicates which ops may be offloaded. The graph analyzer 304 analyzes the dataflow graph to determine the feasibility and the performance cost of dispatching (i.e., offloading) each operator or group of ops. An example of a constraint is that two ops that are specified to be dispatched (i.e., offloaded) to different hardware accelerators may not be combined. Other constraints include whether the target hardware accelerator possesses sufficient on-chip resources (for example, computing capabilities, memory size, bandwidth, etc.) to efficiently run the prospective super-op. The cost model also considers heuristic factors like the number of ops inside a super-op, the op's computational requirements, the resulting number of super-ops in the final graph, and the execution dependency between ops inside one super-op to balance the super-op benefits and the parallelism opportunity of the system.

In some cases, the super-op compiler may drastically reduce the offloading overhead. Therefore, the offload analyzer (not shown) and super-op graph analyzer 304 can utilize common heuristics amongst both to decide their respective outputs. In some embodiments, users are also able to provide directives that indicate which ops or sub-graphs are to be combined. In these embodiments, users only need to specify which sub-graph to combine and do not need to provide a fused implementation for the sub-graph. Ops are combined based on a method of "shallow fusion", in which the existing implementation of the ops is taken as is and then combined together to build a super-op. Using the shallow fusion method, it is not necessary to create a new implementation of the fused op with additional restrictions.

The super-ops candidate repository 306 receives the super-op candidates from the graph analyzer 304 and stores valid data-flow graph structures that define which ops 310 are to be combined. The nodes in these sub-graphs 308 are the same ops (for example, Op5 202) as the ones that were from the original dataflow graph 102.

The super-op code generator 312 receives a candidate super-op (i.e., the combined ops representation 308) from the super-ops candidate repo 306 and generates a new super-op that is computationally equivalent to the sub-graph of the individual ops used to create the super-op. Note that the generation of the new super-op is done systematically and does not require programmers to provide a new implementation for the combined ops in order to generate a super-op. Additional metadata can be generated and attached to the new super-op to allow debugging and profiling of an individual op's Op4, Op5, Op6 computations within the candidate super-op 308. This allows users to debug and profile the super-op as if they were the individual ops from dataflow graph 102.

The super-ops code generator 312 generates new host source code that indicates which ops have been combined. It also generates a navigation table 314 that contains a list of parameters which represents all the individual ops' parameters, and additional metadata that enables the accelerator 108 to navigate from one op's set of computation to the next. The new generated super-op 318 generated by the super-ops code generator 312 is appended to the list of accelerator library ops. During run time, the super-op 318 is selected by a runtime system of the host processing unit 106 for offloading to the hardware accelerator instead of the individual ops being offloaded individually.

In order for the super-op compiler to systematically generate super-ops, (basic) ops are represented in a 'basic-op Intermediate Representation' (IR) format that help the graph analyzer 304 determine whether an op can be combined with other ops into a super-op.

An ops bin repository (repo) 316 stores existing target specific implementation of the super-ops. For example, each super-op has its target specific implementation as a precompiled shared object file. Any other application that is targeted for the same architecture as the shared object is able to include and link the precompiled shared object file during compile time. The repository 316 can also store the source level implementation 318 of the super-ops and their included ops. This provides the flexibility of recompilation into binary using different compiler optimizations.

Figure 4:
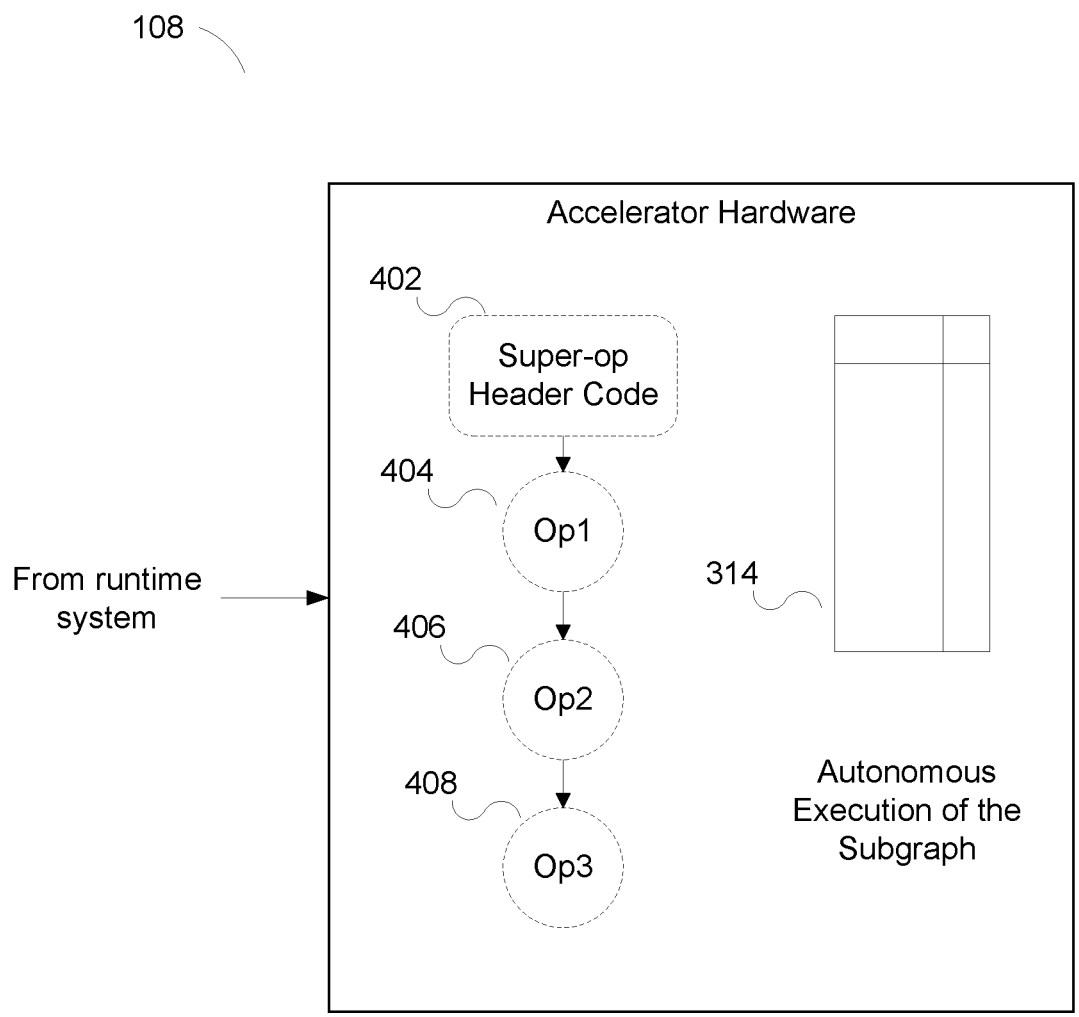
FIG. 4 illustrates accelerator hardware capable of executing super-ops according to an embodiment.

Navigation tables 314 are provided in order to enable the accelerator 108 to use a single offloaded super-op to perform multiple ops worth of computation. The super-op uses a packed data format. Navigation tables 314 are used for data serves as a navigation guide for the super-op in order for it to be able to provide the necessary parameters to each op, and also the control flow from one op to the next. A parameter table is generated that stores data-structure of input and output parameters for ops within the super-op. The data structure contents are populated by the host. In addition to the input and output parameters being stored, the navigation table 314 also contains metadata that indicates the control flow from the current op to the next op to be called within the super-op. In some embodiments, this metadata comprises function pointers of the ops themselves. This information is provided to the hardware accelerator 108, as illustrated in FIG. 4. The hardware accelerator 108 receives the super-ops containing header code 402, ops 404, 406, and 408, and navigation tables 408, performs the operations, and returns any resulting data as instructed. The operators binary repository 316 stores the binary of each op in the super-op and the super-ops code generator 312 provides the super-op header code plus the binaries for the ops to the runtime system of the host processor.

As part of the offloading process, individual ops (called basic-ops) take in provided parameters needed for their computation. In order to facilitate automatic generation of super-ops, implementations of basic-ops must be represented in a intermediate representation (IR). Associated with the IR is a compiler that can generate separate host and accelerator hardware 108 code out of the IR of a basic-op. Accelerator hardware 108 code comprises kernel functions that implement ops or super-ops on the accelerator hardware 108. The compiler will combine together the host and accelerator hardware 108 code of all basic-ops in a super-op by defining input parameters and data across basic-ops according to the navigation table 314 information. The IR allows the compiler, to generate binary ops code, that may be executed by the accelerator hardware 108, and host code, which is executed by the host processor to prepare parameters for the binary ops code and invoke the binary ops code on the accelerator hardware 108. This is done for individual ops separately and allows for the defining of input parameters in the host and binary ops codes to be updated based on how a basic op is combined with other basic ops within the super-op. In some embodiments, the IR consists of an interface descriptor that specifies properties of input and output data to a device-side basic-op kernel function. In some embodiments, input and output data of basic-op kernel functions are specified as function parameters and must be referenced by symbol names (i.e., no hard-coded memory addresses) in the kernel function. In some embodiments, the body of the kernel function cannot have any side-effect other than those specified on the interface descriptor. The IR can express arithmetic operations, variable accesses, and limited form of control-flow. It also supports calling external functions (i.e., functions that are not implemented in the IR) as long as the interface properties of the basic-op kernel function are not violated.

In embodiments, a super-op contains multiple ops worth of computation. When a super-op is offloaded to hardware accelerator, it includes a navigation table 314 of parameters. The navigation table 314 of parameters includes the parameters required by each of the individual original ops and additional metadata that helps the super-op determine the order of ops that function calls must be made for.

Figure 5:
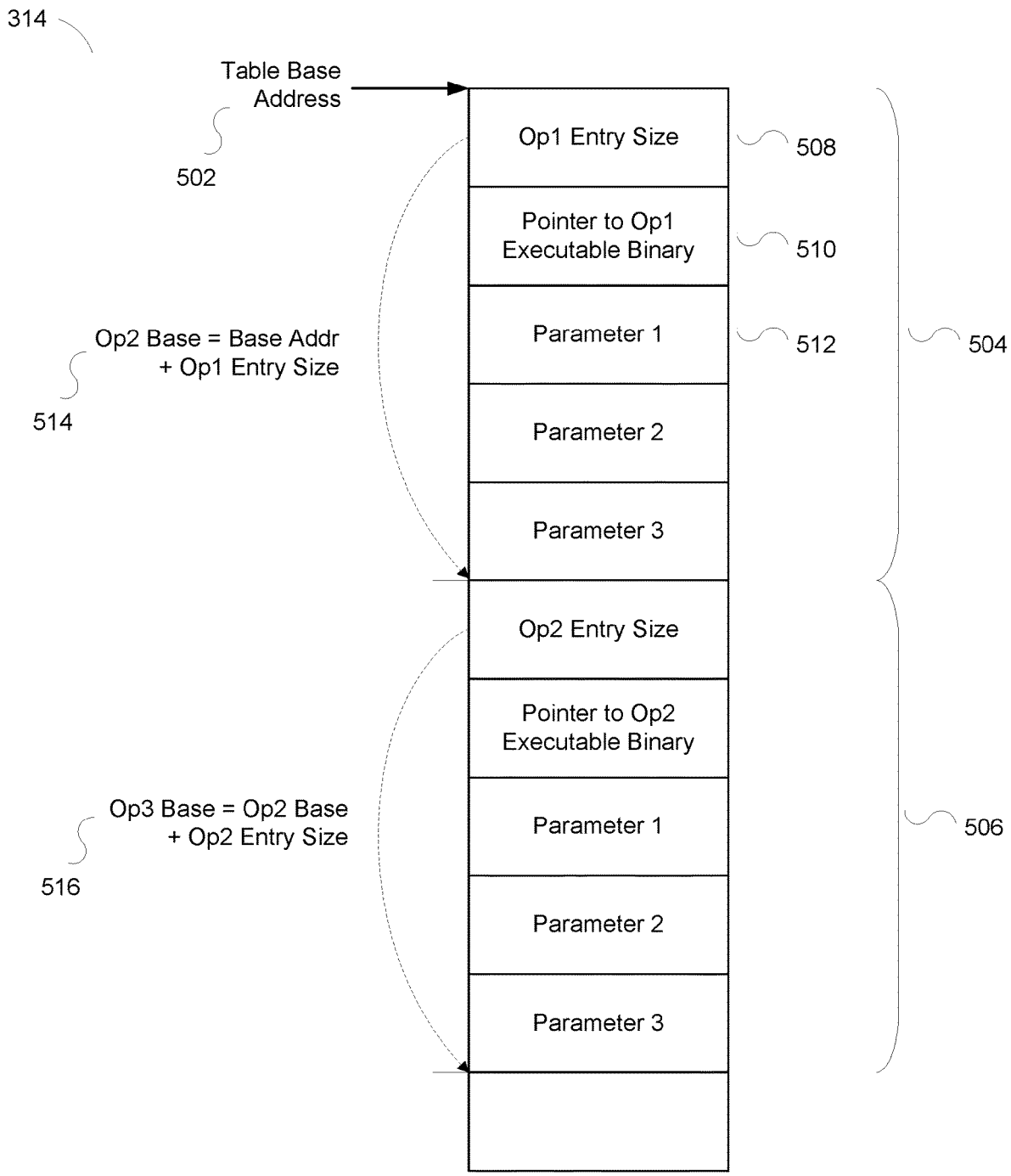
FIG. 5 illustrates a navigation table for use with super-ops according to an embodiment.

FIG. 5 illustrates the structure of the navigation table 314. The navigation table 314 has a base address 502 and a sub-table 504 & 506, for each op in the super-op. The super-op code is aware of which sub-table 504 or 506 it should be retrieving data from. With reference to the op1 sub-table 504, the header parameter, entry size 508, describes the total size of each sub-table 504. With this information, the super-op is able to calculate the offset to traverse from one sub-table 504 to the next 506.

After calculating the offset to load in the successive sub-table, the super-op is able to read the entry in the sub-table that indicates what op to call as a function—e.g., a function pointer. This function pointer is called, and the sub-table's parameter entries are passed in as function parameters.

Conventional programming of the host processing unit 106 would require the hardware accelerator 108 to incur an expensive communication between the host processing unit and the hardware accelerator 108 in order to figure out what is the next set of computations it should perform. The navigation table 314 relaxes this constraint and enables the hardware accelerator 108 to become self-aware of subsequent computation tasks it is supposed to perform, without having to iteratively communicating with the host processing unit for the next set of instructions.

The process of offloading an op to a hardware accelerator incurs a large offload overhead that is difficult to reduce due to constrained hardware design of the hardware accelerator. The super-op is a single op that produces the computation equivalent of many individual ops, while incurring the offload overhead only once. The function calls made by the super-op to multiple ops are within the hardware accelerator itself and therefore the offload overhead is much smaller compared to the overhead related to communication between the host processing unit and the hardware accelerator.

Embodiments of are not limited to any specific dataflow frameworks. Embodiments may also be implemented for neural network applications that use dataflow programming techniques. Neural network frameworks that may implement embodiments include TensorFlow, PyTorch, etc. Furthermore, embodiments can be applied to different variations of hardware accelerators that uses the host-device offloading model such as GPUs, DSPs, FPGAs, etc.

Figure 6:
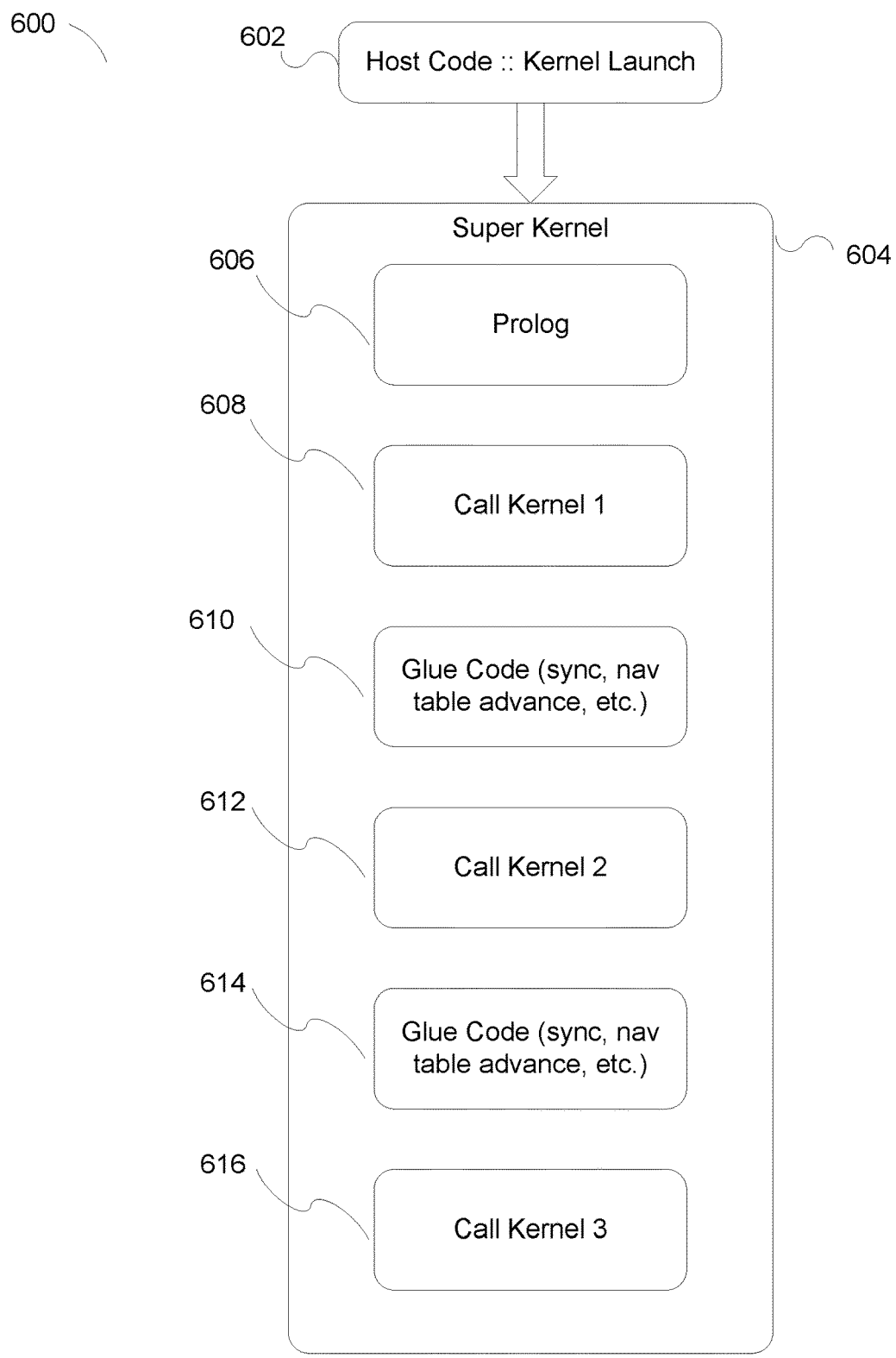
FIG. 6 illustrates a super-op programming model according to an embodiment.

FIG. 6 illustrates a programming model 600 and how ops are offloaded by code running on a host processor (referred to as host code 602) as ops to a accelerator hardware 108. The host code 602 represents execution that determines which op should be offloaded based on the op. The super kernel 604 comprises a prolog 606 to initialize the hardware accelerator 108. It is followed by a first conventional kernel call 608. Glue code 610 comprising synchronization, a navigation table, etc. is provided between kernel calls. By reducing the number of times, during runtime that the host processing unit needs to communicate with the hardware accelerator 108, the end-to-end execution time of the dataflow application is reduced.

The following describes a systematic approach in generating a super-op according to an embodiment. First, a target specific function object is created that describes the op's characteristics. This includes the op type, input/output shapes, data types, hyper-parameters, and target architecture. Next, the input/output dataflow with uniquely identified place holders is described. This has the function of variables that are evaluated at runtime. These place holders are bound to the function object. This process is iterated through each op.

As part of the heuristic, a subset list of all the function objects that represent ops that can be combined into a Super-op is selected. Other variables in the heuristic include a cost-benefit model of the offloading overhead time incurred. One criteria is that all the function objects must be of the same target architecture. A compose API is called that takes in a list of function objects that will return a new function object that represents the super-op. This will combine all the metadata information contained in each of the individual function objects, which is described above with respect to the navigation table 408.

The newly returned function object can then be invoked as a function and offloaded to the device and the host-device run time overhead is incurred once per super-op.

Figure 7:
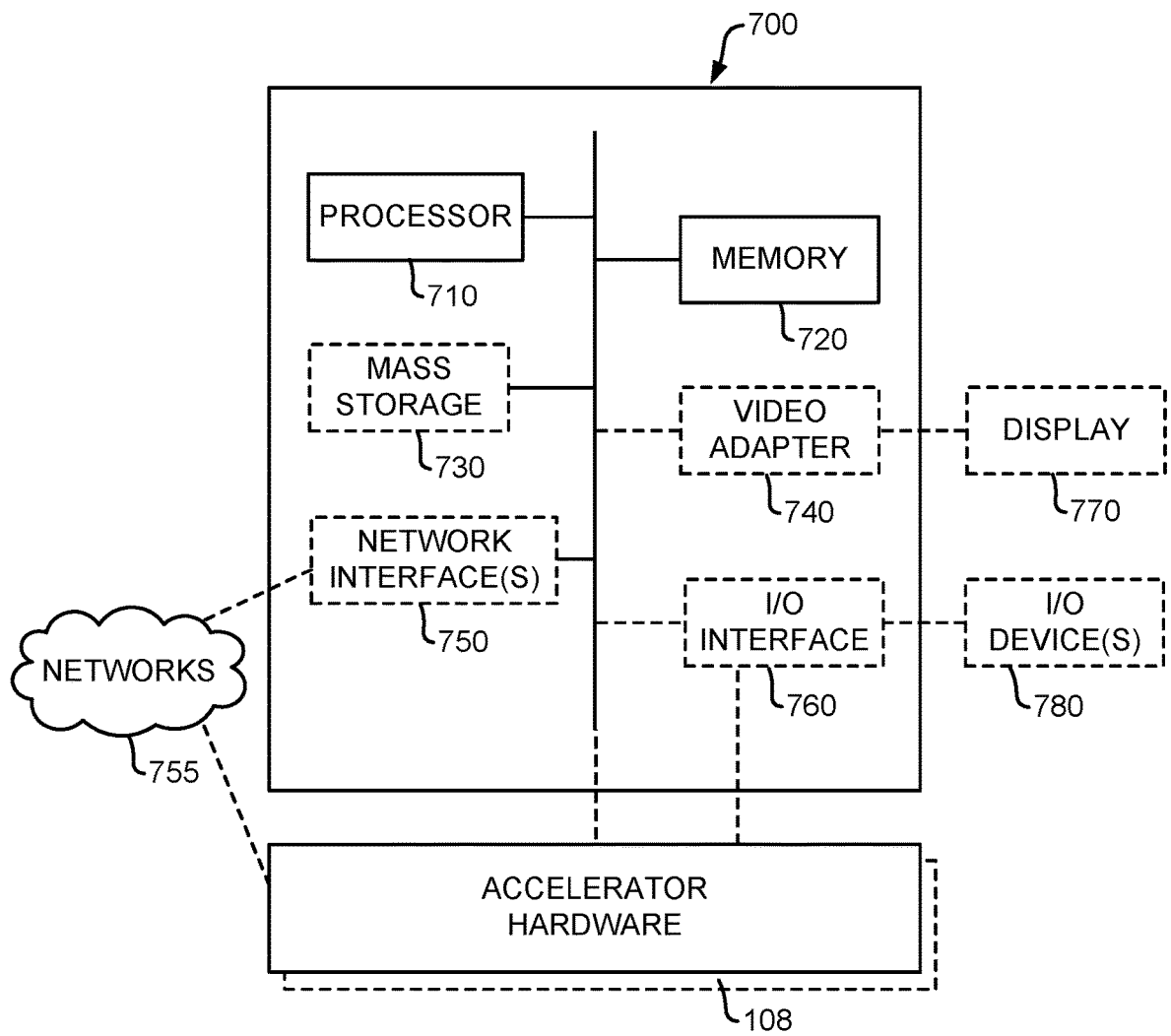
FIG. 7 illustrates configurations of an apparatus according to the present invention.

FIG. 7 is block diagram of a computing system that runs a software compiler that performs the method disclosed herein. In some aspects, a functions may be performed across a plurality of computing systems across a plurality of geographic locations. Computing system 700 may provide an example of computing hardware that be used by an application developer to develop software according to embodiments. This may include hosting and running the super-ops compiler 104 and the runtime system 106. It may also be used to execute software according to embodiments. Computing system 700 may act as a host system to dispatch super-ops to accelerator hardware 108. Accelerator hardware 108 is couple to a host processing unit 700 by a number of means. It may be coupled as a core on the same die as the computing system. It may be a separate die within a multi-chip package integrated circuit (IC). It may be a separate IC on the same PCB as the computing system. It may be a separate module, or card within a computer chassis. It may also be housed separately and be in close proximity, or be remotely located from the computer system. The accelerator hardware 108 may be coupled by any number of means including an internal bus to an IC or multi-chip module, an I/O interface 760 such as SATA, USB, or Thunderbolt. It may also be coupled using wired or wireless technology through a network interface 750. The accelerator hardware 108 may be coupled to the host computer system 700 using multiple means.

Specific embodiments may utilize all of the components shown or only a subset of the components, and levels of integration may vary amongst computing systems. Furthermore, a computing system may contain multiple instances of a component, such as multiple processing units, processors, memories, transmitters, receivers, etc. The computing system 700 typically includes a central processing unit (CPU) 710, a bus and a memory 720, and may optionally also include a mass storage device 730, a video adapter 740, and an I/O interface 760 (each shown in dashed lines to indicate they are optional). The computing system may further include one or more network interface(s) 750 for connecting the computing system to communication networks 755.

The CPU may comprise any type of electronic data processor, and may include one or more cores or processing elements. The memory may comprise any type of non-transitory system memory such as static random access memory (SRAM), dynamic random access memory (DRAM), synchronous DRAM (SDRAM), read-only memory (ROM), or a combination thereof. In an embodiment, the memory may include ROM for use at boot-up, and DRAM for program and data storage for use while executing programs. The bus may be one or more of any type of several bus architectures including a memory bus or memory controller, a peripheral bus, or a video bus.

The mass storage may comprise any type of non-transitory storage device configured to store data, programs, and other information and to make the data, programs, and other information accessible via the bus. The mass storage may comprise, for example, one or more of a solid state drive, hard disk drive, a magnetic disk drive, or an optical disk drive.

The video adapter 740 and the I/O interface 760 provide optional interfaces to couple external input and output devices to the processing unit. Examples of input and output devices include a display 770 coupled to the video adapter 740 and an I/O device 780 such as a touch-screen coupled to the I/O interface 760. Other devices may be coupled to the processing unit, and additional or fewer interfaces may be utilized. For example, a serial interface such as Universal Serial Bus (USB) (not shown) may be used to provide an interface for an external device. Alternatively, the computing system may rely upon the network interface(s) for connection to available mass storage(s), video adapter(s), and I/O interface(s) available on the networks.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method performed by a software compiler, the method comprising:
 determining a plurality of operators to be combined based on characteristics of a hardware accelerator, the determining the plurality of operators to be combined comprises:

analyzing a dataflow graph representing data dependencies between operators of a dataflow application to identify a plurality of candidate groups of operators;

based on characteristics of the hardware accelerator and a plurality of operators which form a candidate group of the plurality of candidate groups, determining whether the plurality of operators of the candidate group are to be combined;

retrieving executable binary code segments corresponding to the plurality of operators to be combined;

generating a unit of binary code including the executable binary code segments and metadata representing an execution control flow among the executable binary code segments; and dispatching the unit of binary code to the hardware accelerator for execution of the unit of binary code.

2. The method of claim 1, wherein determining the plurality of operators to be combined comprises determining whether the plurality of operators should be combined based on whether the plurality of operators are constrained to be executed on different hardware accelerators of a plurality of hardware accelerators.

3. The method of claim 1, wherein determining the plurality of operators to be combined comprises determining whether the plurality of operators should be combined based on available resources of the hardware accelerator.

4. The method of claim 1, wherein determining the plurality of operators to be combined comprises determining whether the plurality of operators should be combined based on a number of the plurality of operators.

5. The method of claim 1, wherein determining the plurality of operators to be combined comprises determining whether the plurality of operators should be combined based on a computation runtime associated with executing all of the plurality of operators.

6. The method of claim 1, wherein generating the unit of binary code comprises generating metadata representing input parameters and output parameters for each operator of the plurality of operators.

7. The method of claim 1, wherein generating the unit of binary code comprises generating metadata representing a plurality of navigation table entries, wherein a given entry of the plurality of navigation entries comprises a field associated with a size of the given entry and a pointer to a given executable binary code segment of the plurality of executable binary code segments.

8. A computer system comprising:
a hardware accelerator;
a memory storing instructions; and
at least one processor in communication with the memory and the hardware accelerator, the at least one processor configured, upon execution of the instructions, to perform the following steps:
  determine a plurality of operators to be combined based on characteristics of the hardware accelerator;
  retrieve executable binary code segments corresponding to the plurality of operators to be combined;
  generate a unit of binary code including the executable binary code segments and metadata representing an execution control flow among the executable binary code segments, the generating the unit of binary code comprises generating metadata representing a plurality of navigation table entries, wherein a given entry of the plurality of navigation entries comprises a field associated with a size of the given entry and a pointer to a given executable binary code segment of the plurality of executable binary code segments; and
  dispatch the unit of binary code to the hardware accelerator for execution of the unit of binary code.

9. The computer system of claim 8, wherein determining the plurality of operators to be combined comprises determining whether the plurality of operators should be combined based on constraints of the hardware accelerator.

10. The computer system of claim 8, wherein determining the plurality of operators to be combined comprises determining whether the plurality of operators should be combined based on available resources of the hardware accelerator.

11. The computer system of claim 8, wherein determining the plurality of operators to be combined comprises determining whether the plurality of operators should be combined based on a number of the plurality of operators.

12. The computer system of claim 8, wherein determining the plurality of operators to be combined comprises determining whether the plurality of operators should be combined based on a computation runtime associated with executing all of the plurality of operators.

13. The computer system of claim 8, wherein generating the unit of binary code comprises generating metadata representing input parameters and output parameters for each operator of the plurality of operators.

14. The computer system of claim 8, wherein the unit of binary code comprises glue code.

15. A non-transitory computer-readable media storing computer instructions that configure at least one processor, upon execution of the instructions, to perform the following steps:
  determine a plurality of operators to be combined based on characteristics of a hardware accelerator;
  retrieve executable binary code segments corresponding to the plurality of operators to be combined;
  generate a unit of binary code including the executable binary code segments and metadata representing an execution control flow among the executable binary code segments, the generating the unit of binary code comprises generating metadata representing input parameters and output parameters for each operator of the plurality of operators; and
  dispatch the unit of binary code to the hardware accelerator for execution of the unit of binary code.

16. The non-transitory computer-readable media of claim 15, wherein determining the plurality of operators to be combined comprises determining whether the plurality of operators should be combined based on constraints of the hardware accelerator.

17. The non-transitory computer-readable media of claim 15, wherein determining the plurality of operators to be combined comprises determining whether the plurality of operators should be combined based on a computation runtime associated with executing all of the plurality of operators.

* * * * *